US011800533B2

(12) United States Patent
Lei et al.

(10) Patent No.: US 11,800,533 B2
(45) Date of Patent: Oct. 24, 2023

(54) ENHANCEMENT OF GC-DCI FOR SPATIAL MULTIPLEXING OF REDCAP UE

(71) Applicant: QUALCOMM Incorporated, San Diego, CA (US)

(72) Inventors: Jing Lei, San Diego, CA (US); Huilin Xu, Temecula, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 17/389,164

(22) Filed: Jul. 29, 2021

(65) Prior Publication Data

US 2022/0046686 A1 Feb. 10, 2022

Related U.S. Application Data

(60) Provisional application No. 63/063,874, filed on Aug. 10, 2020.

(51) Int. Cl.
| | |
|---|---|
| *H04W 72/12* | (2023.01) |
| *H04W 72/14* | (2009.01) |
| *H04L 5/00* | (2006.01) |
| *H04W 72/23* | (2023.01) |
| *H04W 72/1263* | (2023.01) |

(52) U.S. Cl.
CPC ........... *H04W 72/23* (2023.01); *H04L 5/0048* (2013.01); *H04L 5/0055* (2013.01); *H04W 72/1263* (2013.01)

(58) Field of Classification Search
None
See application file for complete search history.

(56) References Cited

U.S. PATENT DOCUMENTS

| | | | | |
|---|---|---|---|---|
| 2008/0228878 | A1* | 9/2008 | Wu ....................... | H04W 72/12 709/205 |
| 2013/0195041 | A1* | 8/2013 | Papasakellariou .... | H04W 72/23 370/329 |
| 2015/0016361 | A1* | 1/2015 | Kim ..................... | H04L 1/0041 370/329 |
| 2019/0305837 | A1* | 10/2019 | Onggosanusi ........ | H04L 5/0057 |

(Continued)

FOREIGN PATENT DOCUMENTS

| | | |
|---|---|---|
| EP | 2658338 A1 | 10/2013 |
| WO | 2014069946 A1 | 5/2014 |

OTHER PUBLICATIONS

International Search Report and Written Opinion—PCT/US2021/043963—ISA/EPO—dated Nov. 29, 2021.

(Continued)

*Primary Examiner* — Steve R Young
(74) *Attorney, Agent, or Firm* — Haynes and Boone, LLP

(57) ABSTRACT

A method of providing downlink control information (DCI) to a plurality of user equipment (UE) is provided. The method includes assigning each of the plurality of UEs to one of a set of groups, each group identified by a group radio network identifier (G-RNTI), and sending to each of the plurality of UEs the G-RNTI, a size of the group, and a position within the group. As such, a group-common DCI (GC-DCI) in which the UE can determine whether or not it has a grant by its assigned position in the group and retrieve the grant from a grant block in the GC-DCI can be sent to the group.

22 Claims, 11 Drawing Sheets

(56) References Cited

U.S. PATENT DOCUMENTS

| | | | | |
|---|---|---|---|---|
| 2020/0146032 A1* | 5/2020 | Bae | .................... | H04L 1/1819 |
| 2020/0383061 A1* | 12/2020 | Yang | .................. | H04W 52/50 |
| 2021/0378031 A1* | 12/2021 | Chai | ................... | H04L 5/0094 |
| 2022/0377785 A1* | 11/2022 | Yao | ....................... | H04L 1/08 |

OTHER PUBLICATIONS

Huawei., et al., "Transmission with Configured Grant in NR Unlicensed Band", 3GPP Draft, 3GPP TSG RAN WG1 Meeting #98, R1-1908112, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051764732, 18 Pages, Retrieved from the Internet: URL: http://www.3gpp.org/ftp/tsg_ran/WG1_Rl1/TSGR1_98/Docs/R1-1908112.zip. [retrieved on Aug. 17, 2019] p. 11, last. parg, The whole document.

* cited by examiner

ENHANCEMENT OF GC-DCI FOR SPATIAL MULTIPLEXING OF REDCAP UE

CROSS-REFERENCE TO RELATED APPLICATIONS

The present application claims priority to and the benefit of U.S. Provisional Patent Application No. 63/063,874, filed Aug. 10, 2020, which are hereby incorporated by reference in their entirety as if fully set forth below and for all applicable purposes.

TECHNICAL FIELD

This application relates to wireless communication systems, and more particularly to group-common (GC) downlink control information (DCI) for spatial multiplexing of reduced capacity (REDCAP) user equipment (UE).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

The 5G standard allows for a complexity of resource allocation for communications between components of the network. The resources include time domain, frequency domain, modulation scheme, and other details of the physical communications. In particular, BSs can provide resource scheduling for each UE that is coupled to it, which can govern both downlink resource scheduling and uplink resource scheduling, through downlink control indicator (DCI) signaling sent from the BS to the UE.

However, there is a proliferation of UEs included in the network. Further, many of these UEs can have limited capability (i.e., reduced capability) for communications. Such UEs include, for example, sensor devices or simple control systems attached to various devices. The resources required to schedule resources for each of these devices can be large.

Consequently, there is a need for better resource allocation for a large number of UEs of limited capabilities coupled to the network.

BRIEF SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a method of providing downlink control information (DCI) to a plurality of user equipment (UE) includes assigning each of the plurality of UEs to one of a set of groups, each group identified by a group radio network identifier (G-RNTI); sending to each of the plurality of UEs the G-RNTI, a size of the group, and a position within the group; and sending a group-common DCI (GC-DCI) packet to a particular group with grants for selected ones of the UEs assigned to the particular group.

In some aspects, a method of receiving downlink control information (DCI) from a base station (BS) includes receiving from the BS a message packet that includes a group radio network identifier (G-RNTI) indicating an assigned group, a size of the assigned group, and a position in the assigned group; receiving a group-common DCI (GC-DCI) packet; determining that the GC-DCI packet is directed to the group indicated by G-RNTI; determining whether a grant is included according to the position in the assigned group; and if a grant is included, receiving the grant.

A base station (BS) according to some aspects includes a transceiver; a communications module coupled to the transceiver to receive and transmit communications to a plurality of user equipment (UEs); and a processor coupled to the transmitter and the communications module, the processor executing instructions to assign each of the plurality of UEs to one of a set of groups, each group identified by a group radio network identifier (G-RNTI); send to each of the plurality of UEs the G-RNTI, a size of the group, and a position within the group; and send a group-common downlink control information (GC-DCI) packet to a particular group with grants for selected ones of the UEs assigned to the particular group.

A user equipment device according to some aspects includes a transceiver; a communications module coupled to the transceiver to receive and transmit communications to a base station (BS); and a processor coupled to the transceiver and the communications module, the processor executing instructions to receive from the BS a message packet that includes a group radio network identifier (G-RNTI) indicating an assigned group, a size of the assigned group, and a position in the assigned group; receive a group-common downlink control information (GC-DCI) packet; determine that the GC-DCI packet is directed to the group indicated by G-RNTI; determine whether a grant is included according to the position in the assigned group; and if a grant is included, receive the grant.

Other aspects, features, and embodiments of the present invention will become apparent to those of ordinary skill in the art, upon reviewing the following description of specific, exemplary embodiments or aspects of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
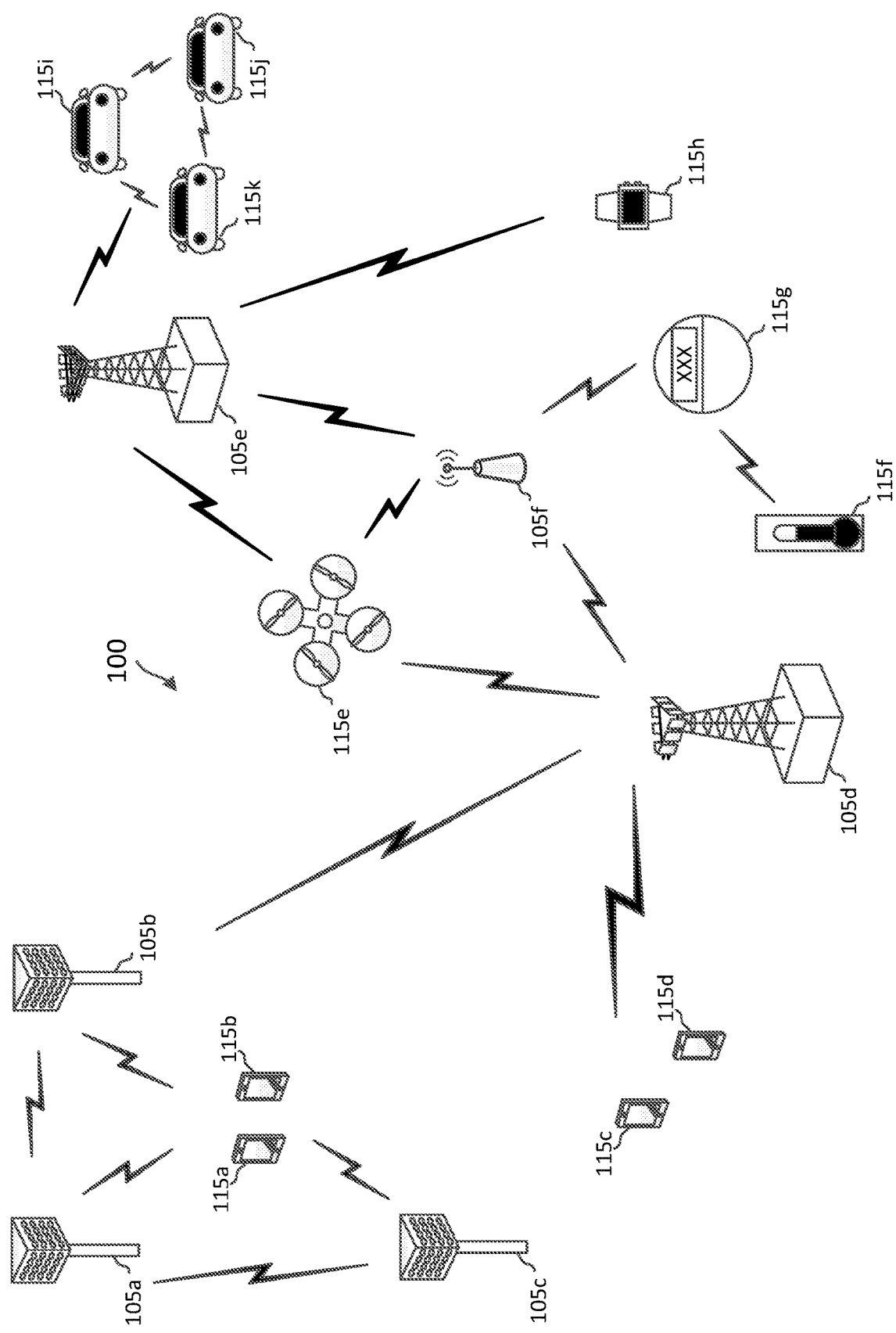
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates to transmission of the Down Link (DL) downlink control indicator (DCI) (sent in a PDSCH transmission) carrying the scheduling grants for a collection of UEs operating in the network. In particular, aspects of the present disclosure can be used with Reduced Capability (RedCap) UEs. In accordance with some aspects of the present disclosure, a BS groups UEs into one or more groups based on some criteria executed by the BS. Each UE then receives from the BS a group identification number (Group Radio Network Temporary Identification, G-RNTI) that identifies membership in a group, the size of the group, and a position of the UE in the group. The BS can then transmit a group-common DCI (GC-DCI) packet that includes the group identifier, an indication to each UE whether a grant for that UE is included, and grants. In some aspects, with large numbers of UEs in a group, the BS may send a sequence of GC-DCIs to include all of the grants.

As indicated above, this disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to some aspects of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as with the small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

Figure 2:
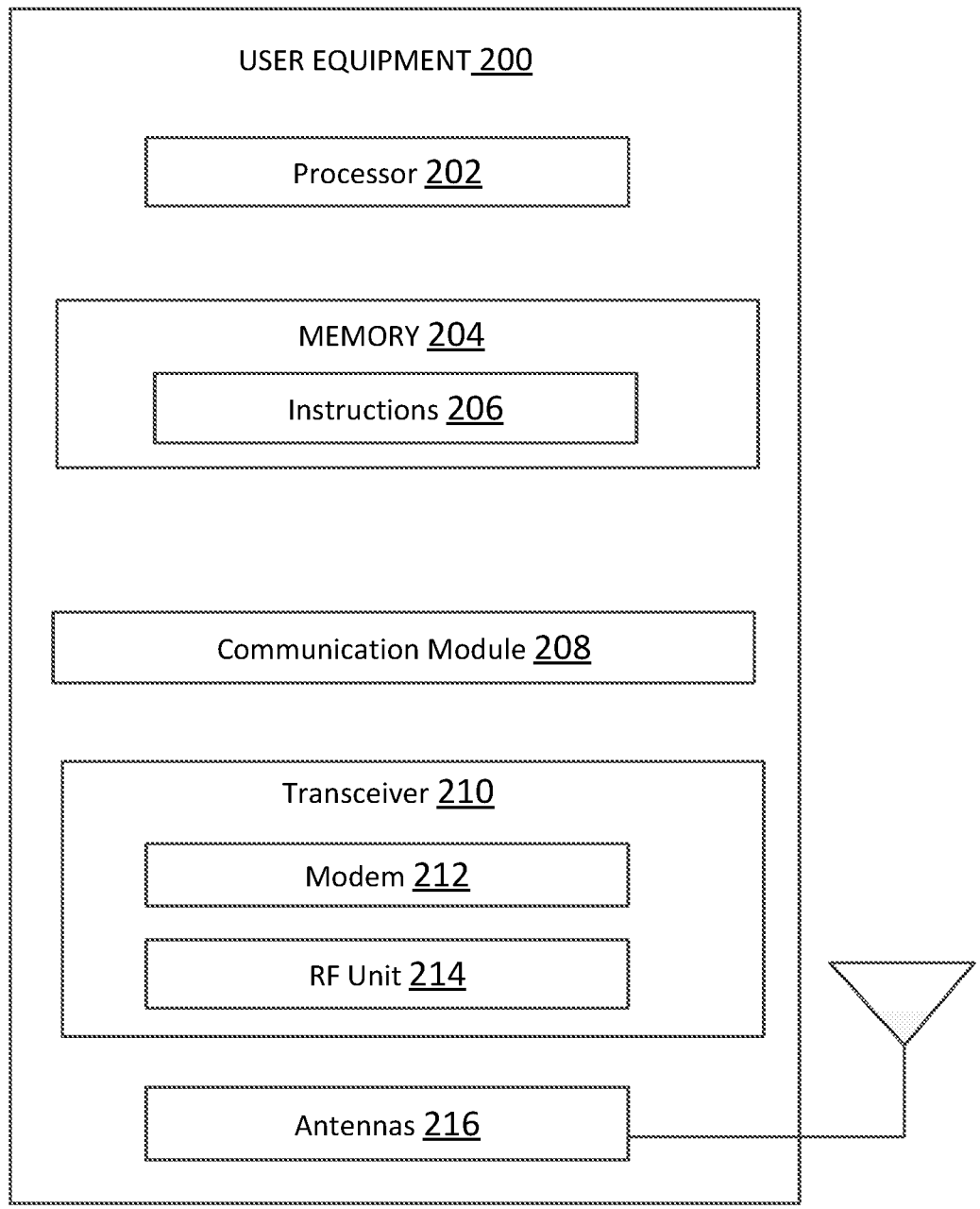
FIG. 2 is a block diagram of an example user equipment (UE) according to aspects of the present disclosure.

FIG. 2 is a block diagram of an example UE 200 according to some aspects of the present disclosure. The UE 200 may be any of UE 115 illustrated in FIG. 1 as discussed above. As shown, the UE 200 may include a processor 202, a memory 204, a communication module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some examples, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with aspects of the present disclosure. The instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 208 may be implemented via hardware, software, or combinations thereof. For example, the communication module 202 may be implemented as a processor, circuit, and/or instructions 206 stored in the memory 204 and executed by the processor 202.

The communications module 208 may be configured to package upload (UL) data within a predetermined frame structure or receive download (DL) data. The predetermined frame structure is set to transmit and receive data through network 100. The communication module 208 may be configured to transmit and receive data between UE 200 and a BS according to the predetermined frame structure. The predetermined frame structure can be a time division duplexing (TDD) or frequency division duplexing (FDD) structure and includes slots for uploading and downloading data. Further, listen-before-talk (LBT) protocols can be implemented such that communications module 208 listens to the physical channel prior to transmitting data.

As shown, the transceiver 210 may include the modem subsystem 212 and the RF unit 214. The transceiver 210 can be configured to communicate bi-directionally with other devices, such as the BSs 105 and/or another core network element. The modem subsystem 212 may be configured to modulate and/or encode the data from the memory 204 and/or the communication module 208 according to a modulation and coding scheme (MCS), e.g., a low-density parity check (LDPC) coding scheme, a turbo coding scheme, a convolutional coding scheme, a digital beamforming scheme, etc., and in accordance with the predetermined frame structure. The RF unit 214 may be configured to process (e.g., perform analog to digital conversion or digital to analog conversion, etc.) modulated/encoded data from the modem subsystem 212 (on outbound transmissions) or of transmissions originating from another source such as a UE or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 200 to enable the UE 200 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
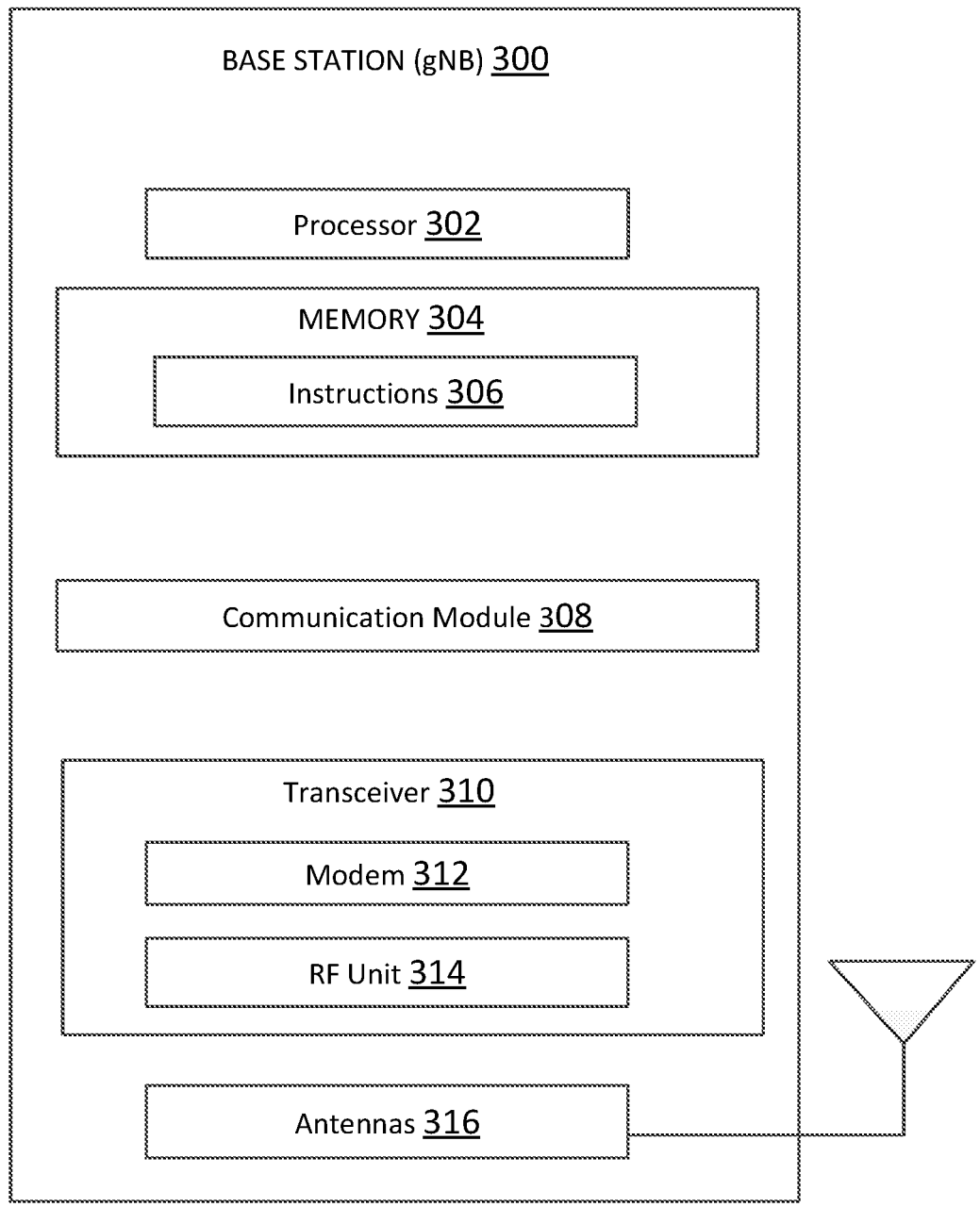
FIG. 3 is a block diagram of an example base station (BS) according to aspects of the present disclosure.

FIG. 3 is a block diagram of an example BS (gNB) 300 according to aspects of the present disclosure. The gNB 300 may be a BS 105 as illustrated in FIG. 1 and discussed above. As shown, gNB 300 may include a processor 302, a memory 304, a communication module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some examples, the memory 304 may include a non-transitory computer-readable medium. The memory 304 may store instructions 306. The instructions 306 may include instructions that, when executed by the processor 302, cause the processor 302 to perform operations described herein. The instructions 306 may also be referred to as code, which may be interpreted broadly to include any type of computer-readable statement(s) as discussed above with respect to FIG. 2.

Communications module 308 may be implemented via hardware, software, or combinations thereof. For example, communication module 308 may be implemented as a processor, circuit, and/or instructions 306 stored in the memory 304 and executed by the processor 302.

The communication module 308 may be configured to prepare or receive data into a predetermined frame structure or retrieve data according to a predetermined frame structure in order to send and receive data. The predetermined frame structure can be a time division duplexing (TDD) or frequency division duplexing (FDD) structure and includes slots for uploading and downloading data. Further, listen-before-talk (LBT) protocols can be implemented such that communications module 308 listens to the physical channel prior to transmitting data.

As shown, the transceiver 310 may include the modem subsystem 312 and the RF unit 314. The transceiver 310 can be configured to communicate bi-directionally with other devices, such as the UE 200 (or any of UE 115s) and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 200 or another BS 105 as illustrated in FIG. 1. The RF unit 314 may be further configured to perform analog beamforming in conjunction with the digital beamforming. Although shown as integrated together in transceiver 310, the modem subsystem 312 and/or the RF unit 314 may be separate devices that are coupled together at the gNB 300 to enable the gNB 300 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 (UE 200) according to aspects of the present disclosure. The antennas 316 may further receive data messages transmitted from other devices and provide the received data messages for processing and/or demodulation at the transceiver 310. The antennas 316 may include multiple antennas of similar or different designs to sustain multiple transmission links.

With reference again to FIG. 1, in some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, 10 slots per frame. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the slots (e.g., DL slots) in a radio frame may be used for DL transmissions and another subset of the slots (e.g., UL slots) in the radio frame may be used for UL transmissions.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a physical DL control channel (PDCCH). The BS 105 may transmit a DL communication signal to the UE 115 via a physical DL shared channel (PDSCH) according to a DL scheduling grant. The UE 115 may transmit an UL communication signal to the BS 105 via a physical UL shared channel (PUSCH) and/or physical UL control channel (PUCCH) according to an UL scheduling grant.

Figure 4:
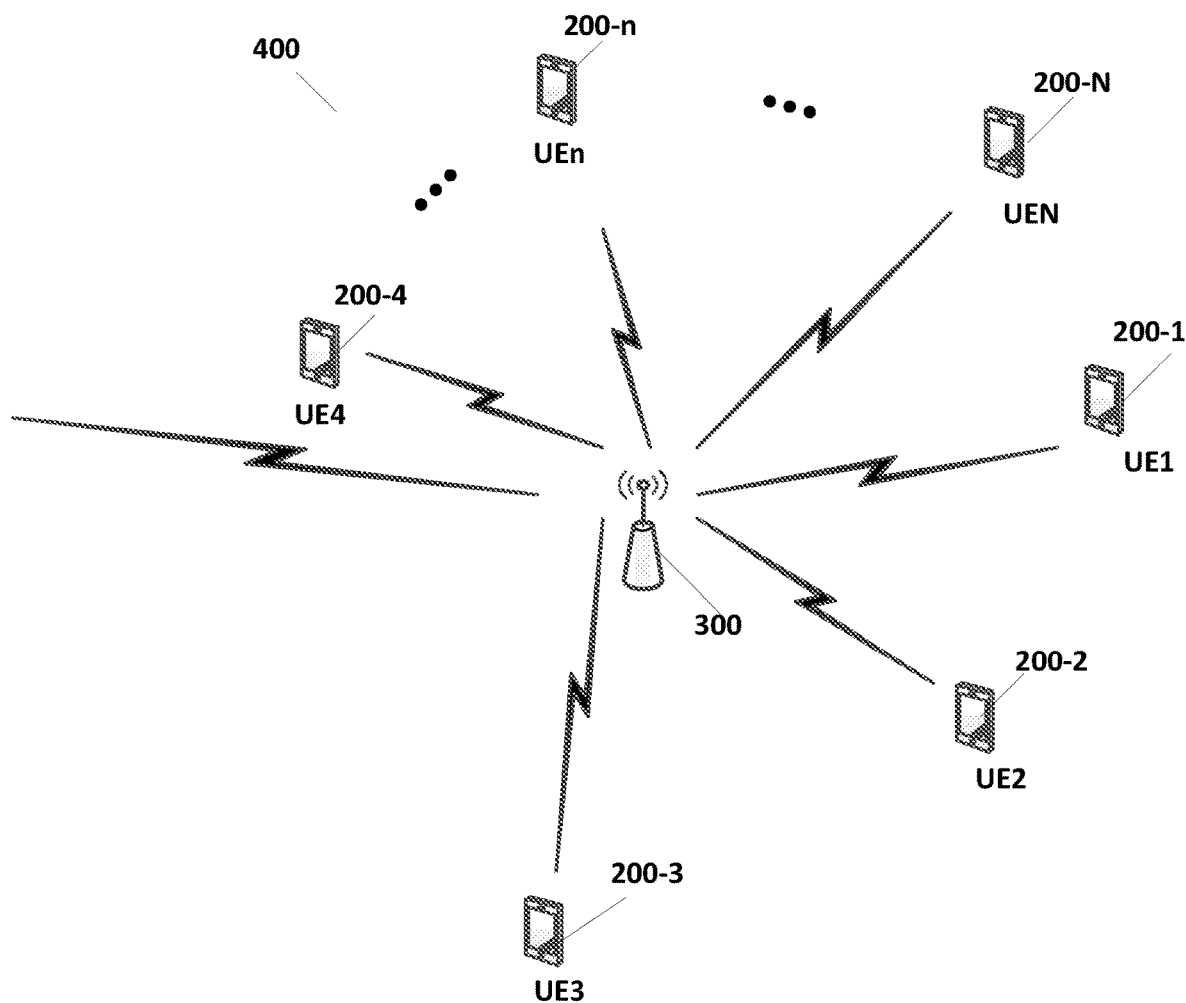
FIG. 4 illustrates dispersion of UEs around an example BS.

FIG. 4 illustrates an arrangement 400 of UEs 200, labeled UE1 200-1 through UEN 200-N, in relation to a BS 300. UEs 200 and BS 300 have been discussed above with respect to FIGS. 2 and 3. As has been discussed above with respect to FIG. 1, there may be more than one BS 300, but for simplicity only one is illustrated in arrangement 400 of FIG. 4. Any arrangement of UES 200 can be provided, UE1 200-1 through UEN 200-N are illustrated, as being in the coverage area of BS 300. Illustrated in arrangement 400, each of UE1 200-1 through UEN 200-N are in communication with BS 300, which is in communication with network 100 as illustrated in FIG. 1. The collection of UEs 200 can be any collection of UEs, including IoTs, sensors, laptops, and smartphones as described above. In particular, at least some of UEs 200-1 through 200-N can have reduced capabilities, i.e. be RedCap UEs, as is further discussed below.

Figure 5A:
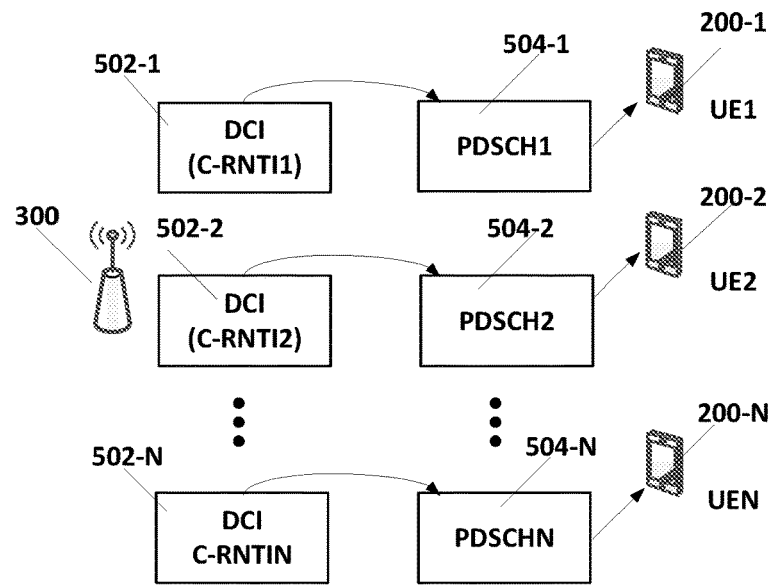
FIGS. 5A and 5B illustrate DCI communication between a BS and the dispersed UEs.
Figure 5B:
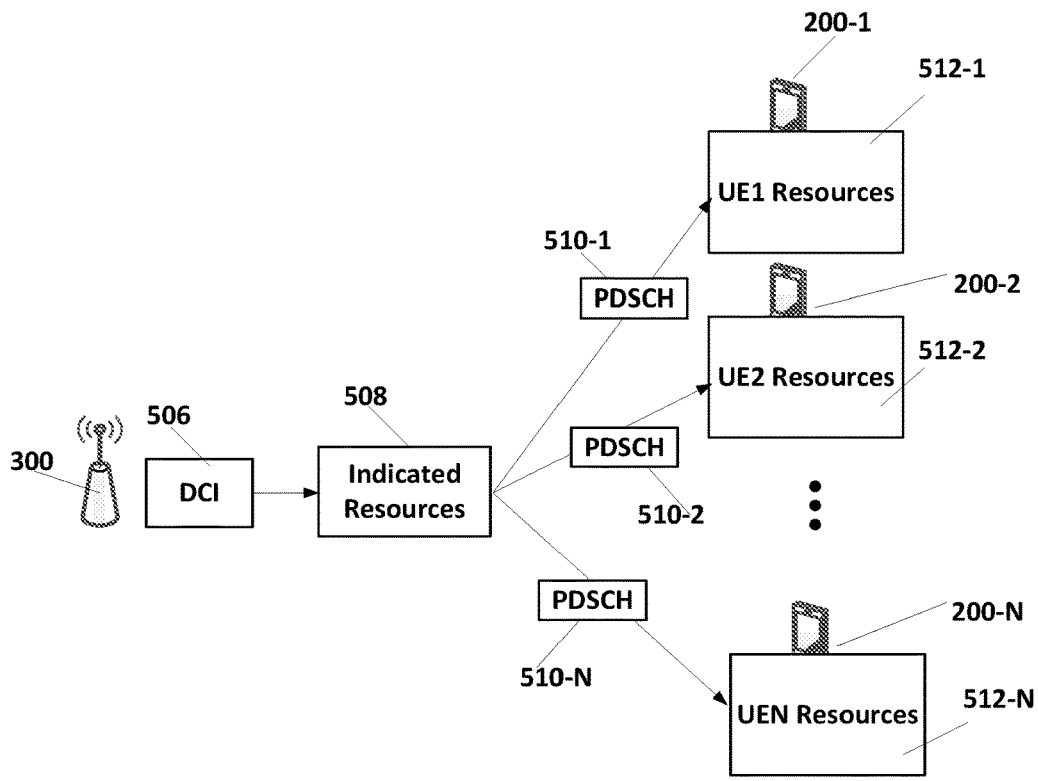

With a large number of UEs 200 in the coverage area of BS 300, there is a challenge to providing DCI services to all of the UEs 200. FIGS. 5A and 5B illustrate management of scheduling of resources in an arrangement of N UEs 200 such as arrangement 400 illustrated in FIG. 4. FIG. 5A illustrates a unicast process where individual DCI instructions are sent to each of UE 200 separately. As is illustrated in FIG. 5A, each UE 200-1 through 200-N is identified by a unique identification used for identifying RRC connection and scheduling of a particular UE. Each UE 200 is identified by its own Cell Radio Network Temporary Identifier (C-RNTI) that has been previously assigned to each of UE 200 by BS 300. As illustrated in FIG. 5A, a unicast communication to each of UE 200 is used to communicate a DCI through a PDSCH transmission. As such, DCI 502-1, with C-RNTI1, is transmitted to UE1 200-1 in PDSCH1 transmission 504-1. Similarly, DCI 502-N, with C-RNTIN, is transmitted to UEN 200-1 in PDSCHN transmission 504-N. Each of UE1 200-1 through UEN 200-N recognizes a DCI transmission to them by the C-RNTI included in the DCI. As illustrated, an excessive amount of resources should be available to allow the large number of unicast PDSCH transmissions that are needed for this process, which is repeated each time there is a need to send new DCI services to UEs 200. Further, each of UEs 200 expends considerable resources monitoring RRC transmissions to capture the DCI services.

FIG. 5B illustrates a multi-cast approach. In this case, a group-common RNTI (GC-RNTI) identifies an entire group of UEs. In FIG. 5B, as an example, all N UEs 200-1 through 200-N as illustrated in FIG. 4 are illustrated. A DCI 506 with a GC-RNTI indicating the group with 200-1 through 200-N is transmitted in PDSCH transmissions 510-1 through 510-N, respectively, using indicated resources 508 to each of UEs 200-1 through 200-N. As indicated, Multiple PDSCHs (each PDSCH 510-1 through 510-N is unicast) are scheduled in parallel by a group-common PDCCH masked with a GC-RNTI. With such a multi-cast DCI 506, each of UEs 200-1 through 200-N derive their own resources 512-1 through 512-N, respectively. However, such a system requires considerable processing from each of UEs 200-1 through 200-N to implement.

However, a class of UEs may not have the capabilities of handling the processing needed for the system of FIG. 5B. Such Reduced Capability (RedCap) UEs have requirements much lessened from the higher-end UEs (e.g., enhanced Mobile Broadband (eMBB) or Ultra Reliable Low Latency Communications (URLLC)). In particular, RedCap UEs have reduced capabilities to lower the device cost and complexity, especially for use with industrial sensors. RedCap UEs can also have compact formfactors. However, RedCap UEs still support FR1/FR2 bands for FDD and TDD data transmission. The following table provides examples of various RedCap UEs and some of their capabilities.

| Use Cases | Wearables | Connected Industries | Smart City Innovations |
|---|---|---|---|
| Example | Smart watches, rings, eHealth related devices, and medical monitoring devices | Pressure sensors, humidity sensors, thermometers, motion sensors, accelerometers, actuators | surveillance cameras |
| Bitrate | Ref bitrate: 5-50/2-5 Mbps in DL/UL; Peak bitrate: up to 150/50 Mbps in DL/UL | Ref bitrate: < 2 mps (UL heavy) | Ref economic bitrate: 2-4 Mbps, 7.5-25 Mbps for high-end video. UL heavy |
| Latency req | -eMBB | <100 ms 5-10 ms for safety related sensors | <500 ms |
| Reliability | -eMBB | 99.99% | 99%-99.99% |
| Battery life | Multiple days (up to 1-2 weeks) | At least a few years | N/A |

Compared with regular or premium UEs designed under current 5G NR standards, RedCap devices have more stringent requirements for power saving, cost reduction, and form factor reduction. Further, the peak data rates (DL and/or UL data rates) and processing capabilities are relaxed. One primary solution to achieve power savings in RedCap UEs is the reduction of PDCCH monitoring in all RRC states, which presents problems for the DCI transmission methods illustrated in FIGS. 5A and 5B.

In accordance with some aspects of the present disclosure, group common DCI formats to support spatial multiplexing of RedCAp devices is presented. These RedCap devices such as video surveillance cameras, sensors, meters, VoIP traffic on wearables, for example, can often have periodic UL and DL traffic patterns, which can be advantageous. Aspects of the present disclosure can result in a reduction in the PDCCH resources used by RedCAP UEs, which improves the co-existence of such devices with regular fully capable UEs. Further, the number of blind decoding and PDCCH Control Channel Elements (CCEs) limits are reduced for RedCAP UEs, which also improves power efficiency.

Figure 6:
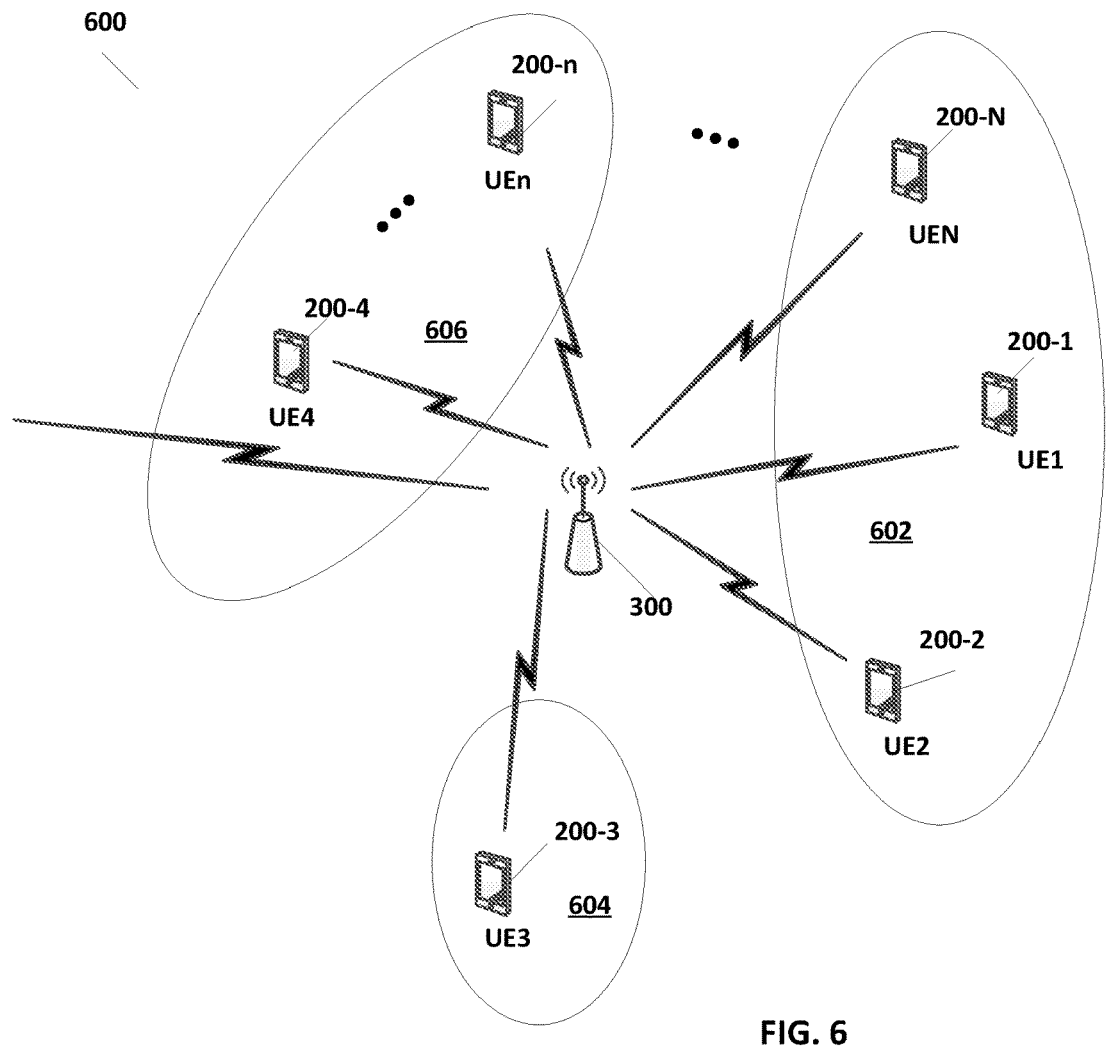
FIG. 6 illustrates grouping of UEs according to some aspects.

In accordance with some aspects of the present disclosure, the UEs 200 are first grouped according to criteria determined by the BS 300. An example of a grouping is illustrated in FIG. 6, where UEs 200-1 through 200-N are grouped into groups 602, 604, and 606. In general, there can be any number of separate groups formed with UEs 200-1 through 200-N with each group having any number of members. BS 300 implements criteria to form groups of UEs, which can be formed by ranking a number of different considerations. One consideration for grouping is identifying UEs that exhibit similar UL/DL traffic patterns. Another consideration for grouping looks at UEs that have similar range of transport block sizes for PDSCH/PUSCH transmissions. Another consideration for grouping is UEs with similar range of DL/UL coverage. Another consideration for grouping is UEs with the same Transmission Configuration Indicator (TCI) states. Yet another consideration for grouping UEs is their association with the same receive beam at BS 300. These and other considerations can be considered to implement criterial to group UEs 200 into assigned groups.

As illustrated in FIG. 6, group 602 includes UE1 200-1, UE2 200-2 and UEN 200-N. Group 604 includes a single UE, UE3 200-3. Group 606 includes UE4 200-4 through UEn 200-n. BS 300 can arrive with groupings with any of UEs 200 placed in each group according to the criteria in effect at BS 300. Once groups are formed, here groups 602, 604, and 606, a new UE 200 (UE 200-(N+1)) can be included by incorporating it into one of the groups according to the criteria being executed by BS 300 or by forming a new group to accommodate the UE 200.

Once the UEs 200 are grouped by BS 300 as discussed above with FIG. 6, the group size and group identification are transmitted to each of the UEs 200 in each group. BS 300 further assigns the position of each UE 200 in the group. BS 300 may randomly assign the position of each UE 200 in a group, or BS 300 may use other considerations for positioning each UE 200 in the group.

Figure 7:
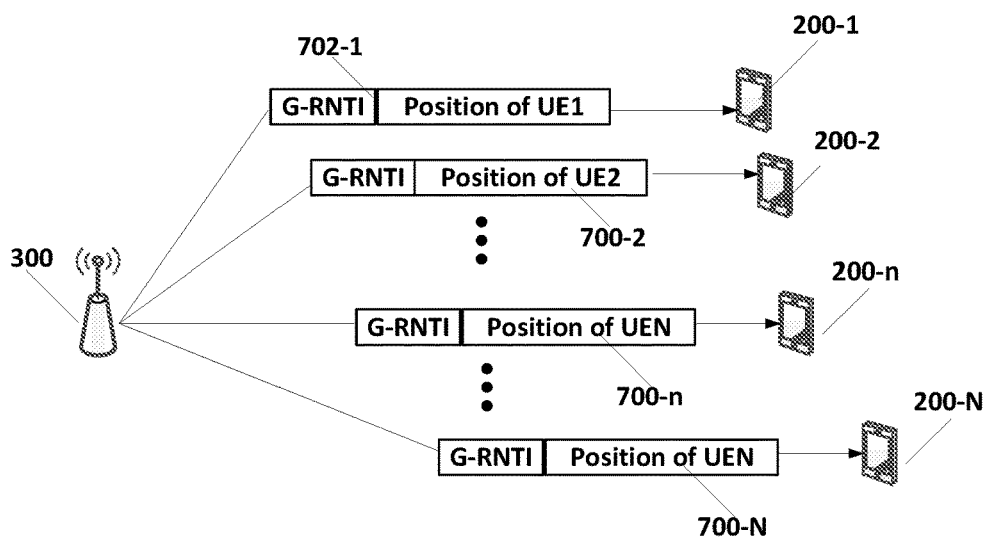
FIG. 7 illustrates initializing groupings of UEs according to some aspects.

As illustrated in FIG. 7, BS 300 transmits message packet 702 that includes a group identification (G-RNTI), the size of the group, and the position of the individual UE 200 in the group to each of UE 200-1 through 200-N. Message 702 is transmitted by BS 300 by dedicated RRC signaling to each of UE 200-1 through 200-N. As illustrated in FIG. 7, message 702-1 to UE 200-1 includes the group ID to which UE 200-1 is assigned, the size of the group, and the position of UE 200-1 within the group.

Similarly, message 702-N to UE 200-N includes the group ID to which UE 200-N is assigned, the size of that group, and the position of UE 200-N within that group. In general, for each arbitration UE 200-$n$, BS 300 transmits a message 702-$n$ to UE 200-$n$ with the group ID (G-RNTI) of the group to which UE 200-$n$ has been assigned along with the size of the group and the position assignment for UE 200-$n$ in the group. After BS 300 transmits the UE grouping information to each of UEs 200, the group RNTI and UE position within the group can be used in a group grant (GC-DCI) scheduling DL/UL transmissions.

Figures 8A, 8B:
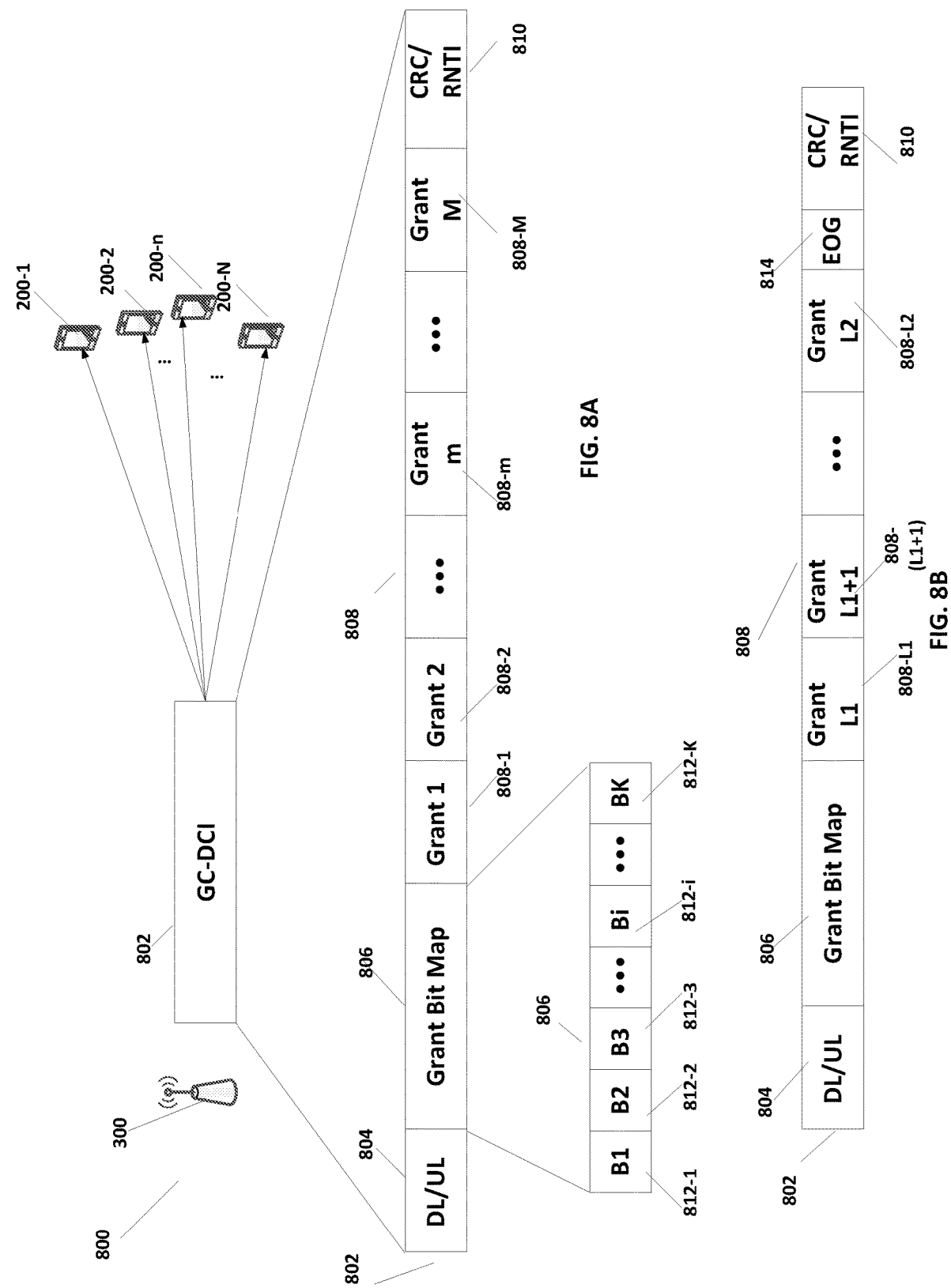
FIGS. 8A and 8B illustrate a group DCI packet transmitted from a BS to a group of UEs according to some aspects.

FIG. 8A illustrates transmission of a GC-DCI 802 to UEs 200-1 through 200-N. As is illustrated, BS 300 transmits a GC-DCI 802 to UEs 200-1 through 200-N through scheduled RRC signaling to each of UE 200-1 through 200-N, of which UE 200-$n$ indicates a random one of UE-200-1 through 200-N. As is illustrated in FIG. 8A, GC-DCI 802 includes a DL/UL flag 804 that indicates whether the grants are for uplink or downlink transmissions, a grant bit map 806 that includes an indication to each UE 200 in a group whether a grant is included, grant block 808, and a block 810 that is a CRC masked with the group ID (G-RNTI) for the group to which the GC-DCI 802 is directed. Grant bit map 801 includes a bit for each UE 200 assigned to the group identified by G-RNTI. As an example, FIG. 8A illustrates a group bit map 806 for a group size of K UEs 200. Group big map 806 is then K bits, one for each cell in the group. Consequently, bits B1 812-1 through BK 812-K are illustrated in grant bit map 806.

As discussed, each UE 200 in the group has an assigned position in bit map 806 where bits 812-1 through 812-K indicate whether a grant is included for each of UEs 200 included in the group. Grant bit map 806 can then indicate that a grant is included in grant block 808 for each UE 200 in the group, or not, by activating the bit in the appropriate position of grant bit map 806. A bit can be activated, for example, by setting it to "1", although in some aspects a bit value of "0" may indicate an active bit. As is illustrated, for UE 200-$n$, which can be assigned position i, bit Bi 812-$i$ indicates whether or not a grant for UE 200-$n$ is included in GC-DCI 802.

As is further illustrated, grant block 808 includes individual grants 808-1 through 808-M for each UE 200 with an activated bit in grant bit map 806. In the example illustrated in FIG. 8A, then, M bits of grant bit map 806 will be activated. Each of grants 808-1 through 808-M are of equal size such that grants can be determined by position in grant block 808. As an example, grant block 808 illustrates M grants 808-1 through 808-M, each corresponding to one of the activated bits in Grant Bit Map 806, and each having the same size. Grants 808-1 through 808-2 are assembled in order of the activated bits. For example, if bit B1 812-1 is active, then grant 808-1 corresponds to the UE 200 in position 1. If B2 812-2 is not active but bit 812-3 is active, then grant UEB 808-2 corresponds to the UE 200 in position 3. UE 200$s$ in the group identified by G-RNTI that do not have an activated bit in grant bit map 806 will not have a grant in grant block 808.

Consequently, when an arbitrary one of UE 200, UE 200-$n$, receives GC-DCI 802, UE 200-$n$ then can determine if GC-DCI 802 is directed to the group of which UE 200-$n$ is a member, determine if there is a grant for UE 200-$n$, and then retrieve the grant directed to UE 200-$n$. UE 200-$n$ retrieves the G-RNTI from block 810 and determines if GC-DCI 802 is directed to the group to which the UE 200-$n$ is a member. Consequently, UE 200-$n$ first retrieves G-RTNI from block 810. If G-RTNI corresponds to the group of which UE 200-$n$ is a member, then UE 200-$n$ retrieves the bit corresponding to its position in grant bit map 806 (e.g., bit Bi 812-$i$) to see if it is activated. If so, then UE 200-$n$ can determine the position of its grant in grant block 808 by the number of activated bits preceding its position in grant bit map 806, for example if Bi is the mth active preceding bits. UE 200-$n$ then retrieves its grant, grant 808-$m$, from grant block 808.

Grants 808-1 through 808-$m$ can include demodulation reference signal (DMRS) resource assignment, power control commands, and/or PUCCH resource indicators, either explicitly or implicitly. To support spatial multiplexing of UEs 200 within the same group, the DMRS resources, power control commands, and/or PUCCH resource indicators can be indexed in a pre-configured order. An example ordering procedure, for example, can order UEs 200 within the same group first in order of orthogonal antenna ports and second in the order of scrambling IDs assigned to the DMRS resources. For example, if UE 200-$n$ is assigned a grant for DL/UL in GC-DCI 802, by activating the corresponding position bit 812-$i$ in grant bit map 806, then UE 200-$n$ can receive indicating of DMRS resources. In a first option, the grant field 808-$m$ includes signaling for the index of the DMRS resource, power control commands, and/or PUCCH resource indicators in the grant itself (e.g., grant 808-$m$). In some aspects, DMRS resources can be implicitly signaled by position of grant 808-$m$ in the grant block 808, with the DMRS resources, power control commands, and/or PUCCH resources indicators assigned in advance (e.g., the position m in grant block 808 can also be used to index the DMRS resources assigned to UE 200-$n$). In that fashion, the resources can be optimally utilized within the group.

Figure 9:
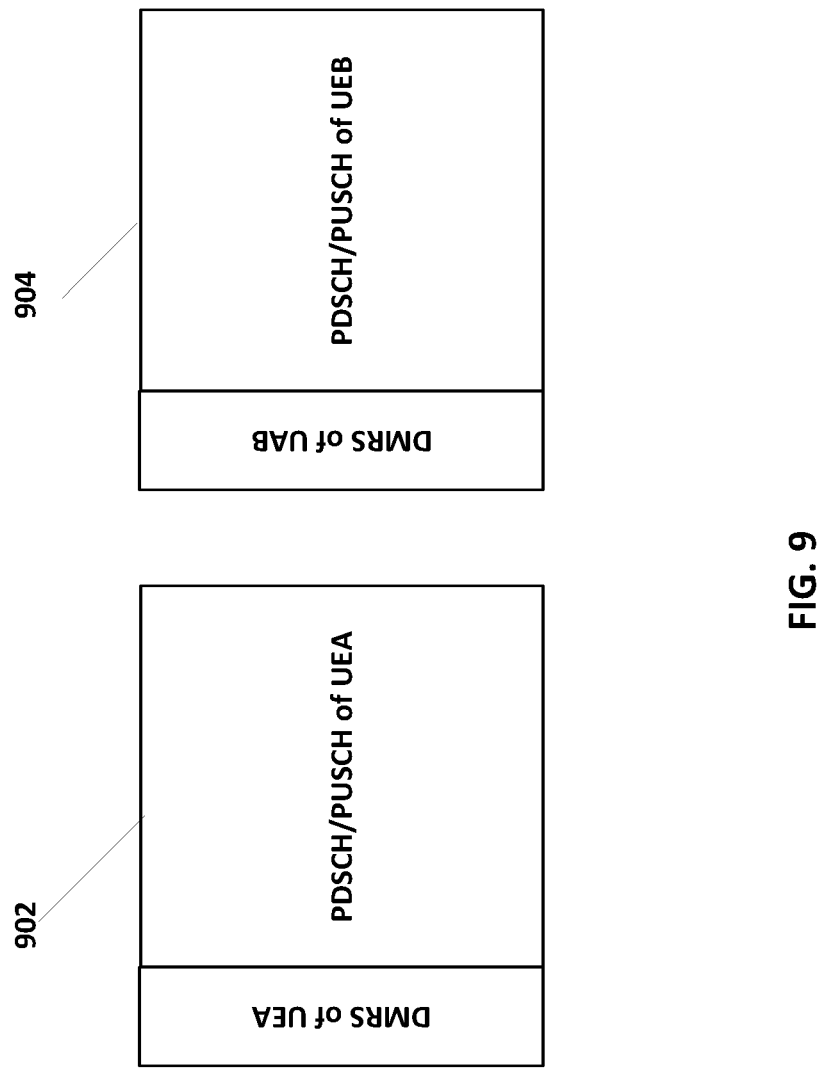
FIG. 9 illustrates demodulation reference signal (DMRS) allocations for some UEs.

FIG. 9 illustrates arrangement of DMRS resources for two UEs in the group, DMRS resources 902 for UEA and DMRS resources 904 of UEB. UEA and UEB are UEs 200 that are members of the same group. The DMRS resources assigned to individual UEs 200 in the group can be mapped to fully or partially overlapping time/frequency resources. FIG. 9 illustrates an example where DMRS resources 902 and 904 do not overlap, but the DMRS resources assigned to UEA can be fully or partially overlapping with the DMRS resources assigned with UEB.

If the group size K is very large and the number of grants M is also large, multiple GC-DCIs may occur to accommodate the data. In that case, an "end of group grant" (EOG) flag can be mapped to a number of GC-DCI associated with the UE group. FIG. 8B illustrates an example where an EOG flag 814 is provided in GC-DCI 802. Although EOG 814 is illustrated as located just prior to block 810, EOG flag 814 can occur anywhere in GC-DCI 802, included immediately following DL/UL 804 or after grant bit map 806.

Consequently, with EOG flag 814, the assignment of group grants can be transmitted in batches. For example, EOG flag 14 can be activated (e.g., set to "1") to indicate that BS 300 will transmit additional GC-DCIs for scheduled UEs in the group. As illustrated in FIG. 8B, BS 300 in GC-DCI 802 sends Grant L1 808-L1 through grant L2 808-L2. Over multiple transmissions of GC-DCI 802, all of grant 1 808-1 through grant M 808-M are transmitted. Consequently, a UE 200-*n* that is a member of the group and indicated to be receiving a grant in the grant bit map 806, but which has not already received the grant, will continue to monitor the GC-DCI sent subsequently to receive the grant. A UE 200 that is not indicated in grant bit map 806 will stop monitoring GC-DCI 802. When BS 300 set the EOG flag 14 to not active (e.g., set to "0") then BS 300 will not transmit additional GC-DCI beyond the present one and consequently UE 200, for example UE 200-*n*, that are members of the group will stop monitoring the GC-DCI, even if the UE 200 has not received the grant that was indicated in grant bit map 806.

Figure 10A:
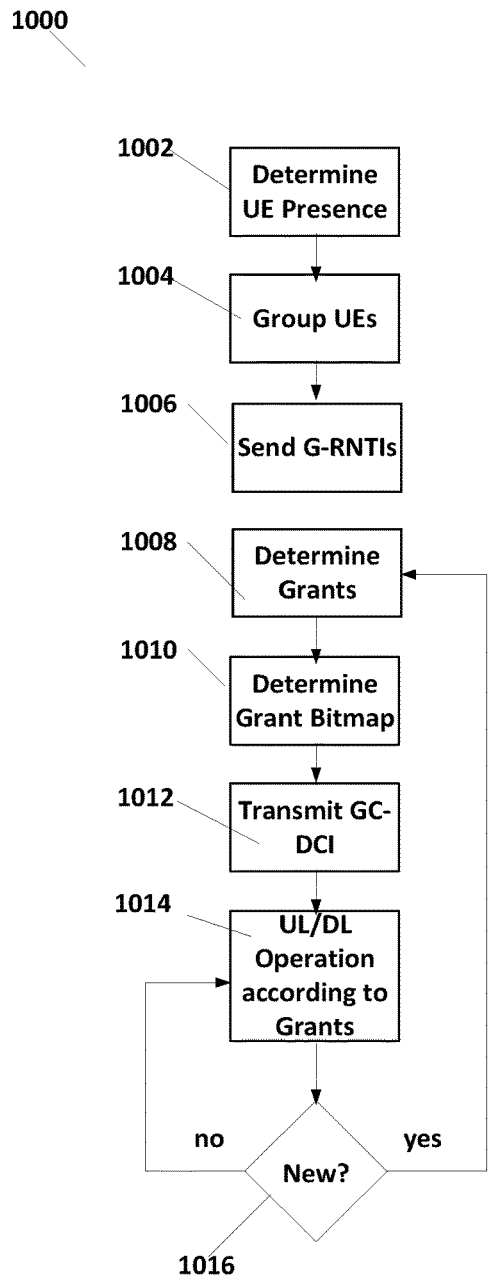
FIGS. 10A and 10B illustrate processes operating on a BS and a UE, respectively, according to some aspects.

FIG. 10A illustrates an example process 1000 that can be executed on BS 300 as illustrated in FIG. 3 to implement some aspects of the present disclosure. In step 1002, BS 300 determines the presence of UE 200-1 through 200-N as illustrated in FIG. 6. In step 1004, BS 300 groups the UEs using criteria as discussed above. As is illustrated in FIG. 6, in step 1004 BS 300 assigns each of UE 200-1 through 200-N to one of a number of groups based on the criteria being executed by BS 300. In step 1006, BS 300 transmits to each of UE 200-1 through 200-N its group ID (G-RTNI), the group size, and its position in that group. Steps 1002, 1004, and 1006 indicate an initialization of the groups and UE 200-1 through UE 200-N membership in its group.

In step 1008, BS 300 determines resource and scheduling grants for at least some of the members of one group, as illustrated in FIG. 8A grants 808-1 through 808-M for either an UL or a DL and indicates the UL/DL flag. As is illustrated in FIG. 8A, in a group of K members, M (M≤K) grants can be made. In step 1010, BS 300 creates the grant bitmap 806 as illustrated in FIG. 8A. In step 1012, BS 300 assembles GC-DCI 802 (adding the DL/UL flag 804 and assembling block 810 by masking a CRC with the G-RTNI of the group) and transmits the GC-DCI to UEs 200 that are members of the group as identified by the G-RTNI included in block 810.

In step 1014, BS 300 operates with UL/DL grants according to the GC-DCI 802 transmitted to UEs 200-1 through 200-N. In step 1016, BS 300 determines whether new grants should be transmitted. If there are new grants, then BS 300 returns to step 1008 to construct GC-DCI 802. If there are no new grants, then BS 300 continues to operate under step 1014.

Figure 10B:
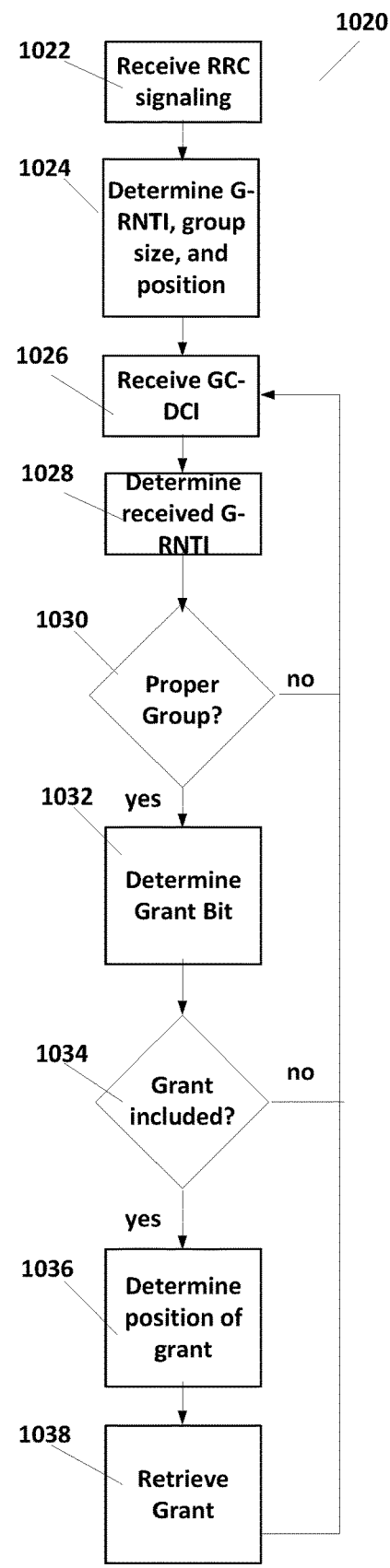

FIG. 10B illustrates an example process 1020 that can be executed on a UE 200 as illustrated in FIG. 2. For exemplary purposes, a random UE 200, UE 200-*n*, is discussed. In step 1022 of process 1020, UE 200-*n* receives the RRC signaling transmitted by BS 300 in step 1006 of process 1000. In step 1024, UE 200-*n* determines and stores the group ID (G-RNTI), the group size, and the position of UE 200-*n* in the group. In the example indicated above with FIG. 8A, the group size is K and the position of UE 200-*n* in the group is position i.

In step 1026, UE 200-*n* receives a GC-DCI 802 transmitted by BS 300 in step 1012 of process 1000. GC-DCI 802 takes the form illustrated in FIG. 8A as discussed above. Consequently, in step 1028, UE 200-*n* retrieves the G-RTNI in block 810. In step 1030, UE 200-*n* determines whether UE 200-*n* is a member of the group indicated by the G-RTNI. If not, the UE 200-*n* returns to step 1026 to wait for another GC-DCI 802. If UE 200-*n* is in the group indicated by the G-RTNI, then UE 200-*n* proceeds to step 1032.

In step 1032, UE 200-*n* reads the bit in grant bit map 806 corresponding to the position of UE 200-*n* in the group, in this example bit Bi 812-*i*. In step 1034, UE 200-*n* determines whether it has a grant by determining whether bit Bi 812-*i* of grant bit map 806 is active or not. If bit Bi 812-*i* is inactive, indicating that GC-DCI 802 does not include a grant for UE 200-*n*, then UE 200-*n* proceeds to step 1026 to wait for another GC-DCI 802. If GC-DCI 802 does include a grant, then UE 200-*n* proceeds to step 1036. In step 1036, UE 200-*n* determines the position of the grant in grants 808 by determining the number of activated bits in grant bit map 806 that precede bit Bi 812-*i*. In this example, there the grant position is determined to be grant m 808-*m*. In step 1038, UE 200-*n* then retrieves the grant, grant m 808-*m*, that is directed to it.

Figure 11A:
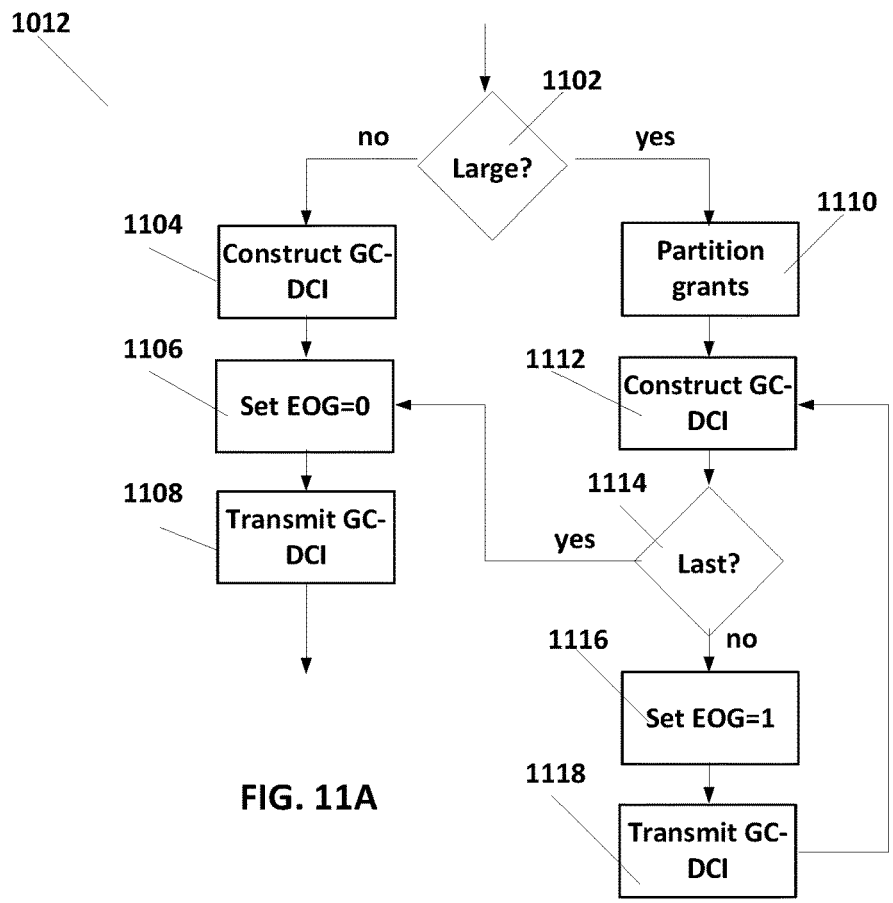
FIGS. 11A and 11B further illustrate the processes illustrated in FIGS. 10A and 10B according to some aspects.
Figure 11B:
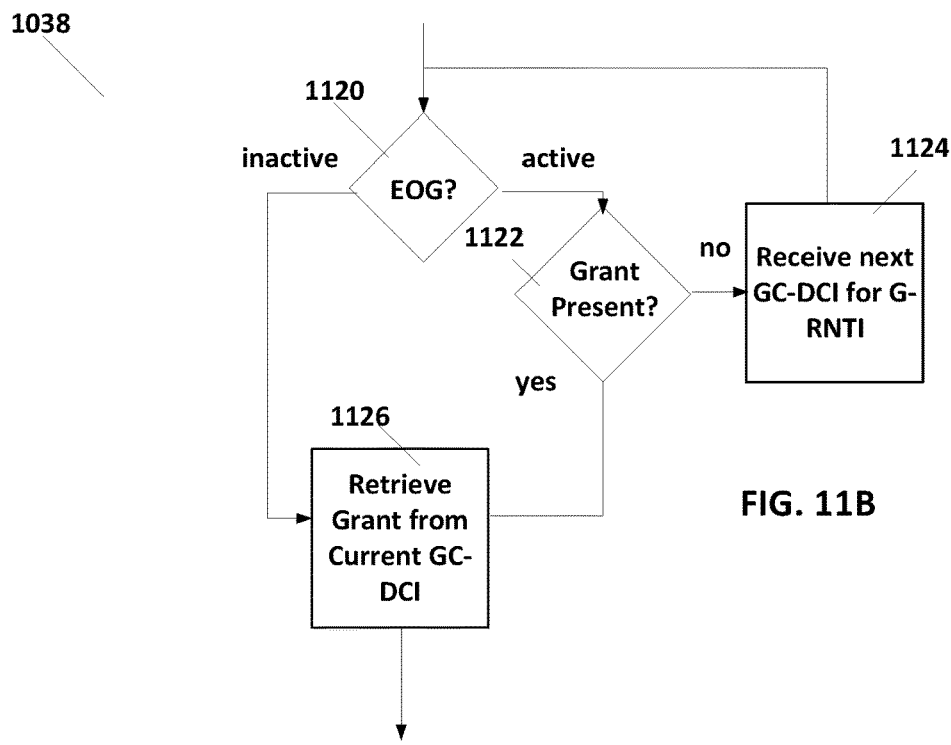

FIGS. 10A and 10B illustrate operation of BS 300 and UE 200-*n* with GC-DCI 802 as illustrated in FIG. 8A. FIGS. 11A and 11B refine the operation of BS 300 and UE 200-*n* in the case where BS 300 has the capability of sending batch GC-DCI 802 as is discussed above with respect to FIG. 8B.

FIG. 11A illustrates step 1012 of process 1000 in BS 300 where BS 300 is capable of batch transmission. As indicated, in step 1102 BS 300 determines whether there is a large number of grants such that transmission over several GC-DCIs 802 should be used. If not, then BS 300 proceeds to step 1104. In step 1104, BS 300 constructs the GC-DCI and includes all of the grants, grants 808-1 through 808-M. In step 1106, BS 300 sets the EOG flag 814 to inactive (e.g. EOG=0) and in step 1108 BS 300 transmits GC-DCI 802. In this case, only one GC-DCI is sent that includes all of the grants for the indicated UE 200s in the group.

If the number of grants is too large to be sent in a single GC-DCI 802, then from step 1102 BS 300 proceeds to step 1110. In step 1110, BS 300 partitions grants 808-1 through 808-M into multiple sequential blocks to be sent in two or more GC-DCIs 802. In step 1112, a GC-DCI 802 is constructed with the grants as partitioned in step 1110. GC-DCI 802 as illustrated in FIG. 8B, the constructed GC-DCI 802 includes grants L1 808-L1 through L2 808-L2, which is a subset of grants 1 808-1 through M 808-M. Step 1110 separates the grants to be transmitted in a sequence of packets GC-DCI 802 and step 1112 constructs GC-DCI packets 802 according to the petitions. It should be noted that grant bit map 806 remains constant across all of the GC-DCIs 802 in the sequence of GC-DCIs 802.

In step 1114, BS 300 determines whether the current GC-DCI 802 is the last of the sequence or not (e.g., if the current GC-DCI 802 will include the last of the grant 1 808-1 through grant M 808-M). If it is, then BS 300 proceeds to step 1106 where EOG flag 814 is set to inactive and the GC-DCI is transmitted in step 1108. If this is not the last GC-DCI 802 in the sequence, then BS 300 proceeds to step 1116 where the EOG flag 814 is set to active (e.g., EOG=1). The GC-DCI 802 is then transmitted in step 1118 and BS 300 returns to step 1112 to construct the next GC-DCI 802 in the sequence.

FIG. 11B illustrates step 1038 of process 1020 executed on UE 200-*n* when BS 300 is capable of batch transmission of GC-DCI 802. In step 1120, UE 200-*n* checks EOG flag 814 of GC-DCI 802 as illustrated in FIG. 8B. If EOG is inactive (e.g., EOG=0), then UE 200-*n* proceeds to step 1126 to retrieve the grant from the grant position indicated in step 1036 of process 1020. If EOG is active (e.g., EOG=1), then UE 200-*n* proceeds to step 1122. In step 1122, UE 200-*n* determines whether or not the grant is present in the current GC-DCI 802. This can be accomplished by determining whether the grant in the position indicated in step 1036 has arrived yet. If the grant is present in the current GC-DCI 802, then UE 200-*n* proceeds to step 1126 to retrieve the grant. If the grant is not present in the current GC-DCI 802, then UE 200-*n* proceeds to step 1124 to receive the next GC-DCI 802 in the sequence. Once the next GC-DCI 802 is received, UE 200-*n* proceeds to step 1120.

Figure 12A:
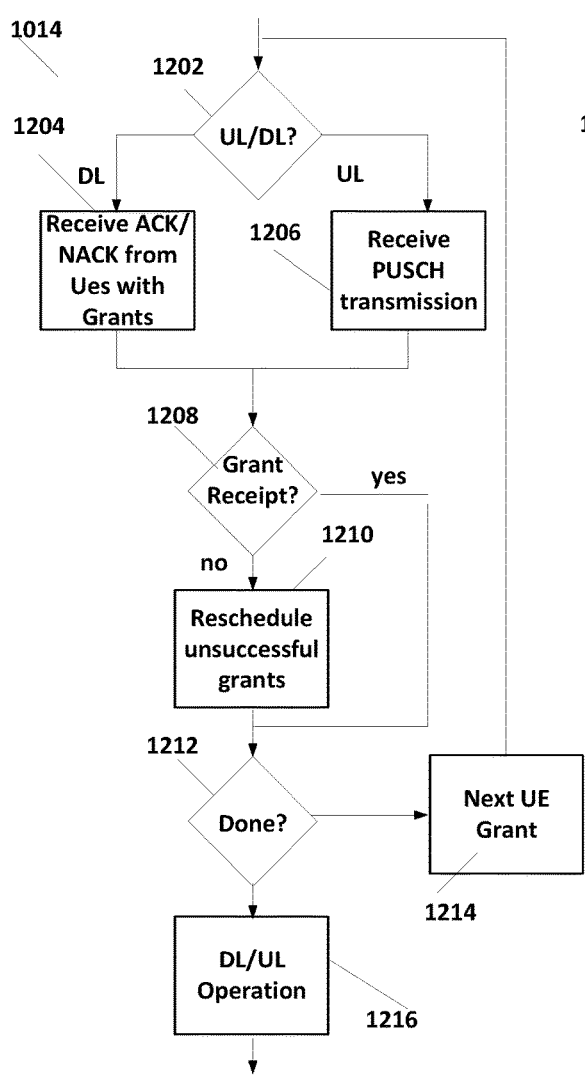
FIGS. 12A and 12B illustrate processing of a grant as illustrated in FIGS. 10A and 10B in the BS and UE, respectively.
Figure 12B:
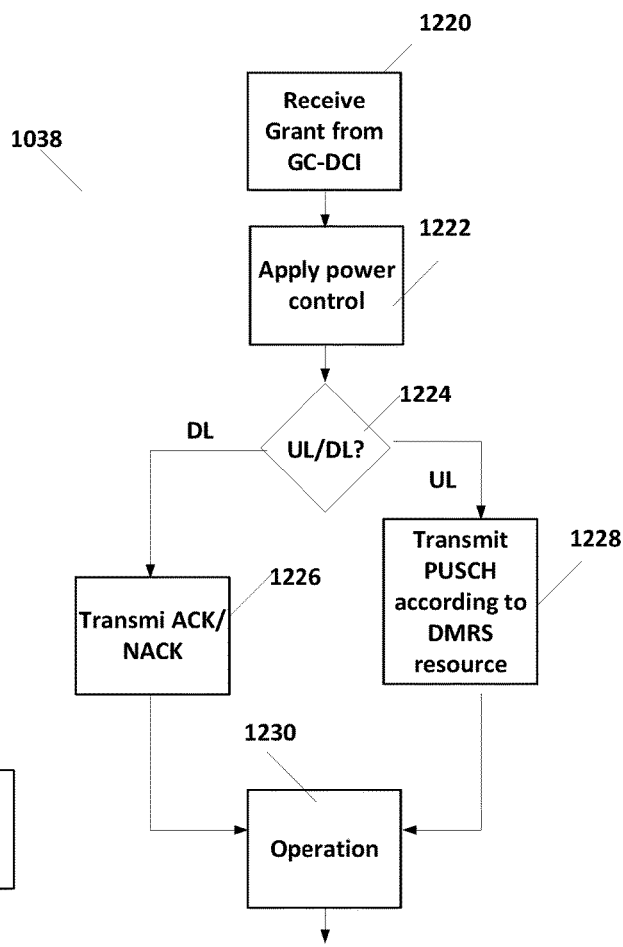

Consequently, aspects of the present disclosure allow for providing group DCI scheduling to large numbers of UEs 200 in the presence of a BS 300. FIGS. 12A and 12B further illustrate processing of DCI grants 808 according to some aspects. FIG. 12A illustrates further operation of step 1014 of FIG. 10A. As illustrated in FIG. 12A, in step 1202 BS 300 illustrates operation in an UL/DL for each of UEs 200-1 through 200-N that receive a grant in grant block 808. In step 1212, if UL/DL flag 804 is set to DL then BS 300 proceeds to step 1204. In step 1204, BS 300 receives ACK/NACK from the UE 200 that has received the current grant according to an associated PUCCH resource of the grant. If step 1202 indicates UL, then BS 300 proceeds to step 1206 to receive a PUSCH transmission from the UE-200 that received the grant according to the grant in grant block 808 assigned to the UE 200. Steps 1204 and 1206 each proceed to step 1208. In step 1208, if the grant has failed then BS 300 proceeds to step 1210 where the grant is rescheduled for transmission in a subsequent GC-DCI transmission. If, in step 1208, the grant is successful, then BS 300 proceeds directly to step 1212. In step 1212, BS 300 determines that all grants have been processed. If yes, then BS 300 proceeds to step 1216 where operation continues. If not, then BS 300 proceeds to the next grant in step 1214 and returns to step 1202. In step 1014, BS 300 confirms that the grants 808-1 through 808-M sent to UEs 200-1 through 200-N were received that receive grant. If the grants have been received, then BS proceeds to step 1216 for UL/DL operation as discussed above. If not, then in step 1206, BS 300 can reschedule the grant transmission. As discussed with respect to FIG. 10A, in step 1016, BS 300 determines whether there are new grants and if so (for example if rescheduled in step 1206), returns to step 1008 of FIG. 10A. If not, then BS 300 returns to step 1208 of step 1016 for UL/DL operation according to the grants.

FIG. 12B further illustrates operation in step 1038 of one UE 200 that receives a grant, e.g. UE 200-*n* as discussed above. As discussed with respect to FIG. 11B, operation in step 1038 may include processing to receive its grant through batch transmission from BS 300. In step 1220, UE 200-*n* receives its assigned grant from BS 300. In step 1222, UE 200-*n* applies power control to PUCCH transmission according to the associated power control commands implicitly or explicitly transmitted with grant 808-*m* as discussed above. In step 1224, UE 200-*n* determines from UL/DL flag 804 whether grant 808-*m* is an UL or DL grant. If grant 808-*m* received into UE 202-*n* is a DL grant, then UE 200-*n* proceeds to step 1226 to transmit an ACK/NACK according to the associated PUCCH resource received explicitly or implicitly in grant 808-*m*. If grant 808-*m* is a UL grant, then UE 200-*n* proceeds to step 1228 to transmit a spatially multiplexed PUSCH according to the associated DMRS resource implicitly or explicitly indicated in the GC-DCI grant block 808. From steps 1226 or 1228, UE 200-*n* proceeds to step 1230 to continue operation.

In steps 1216 of BS 300 operation and step 1230 of UE 200-*n* operation, BS 300 downloads data or upload data according to the grant to UE 200-*n* and UE 200-*n* uploads data or downloads data according to the grant. In particular, if grant 808-*m* to UE 200-*n* is a DL grant, then in step 1230, UE 200-*n* decodes spatially multiplexed PDSCH transmissions according to the associated DMRS resource assignment implicitly or explicitly indicated with grant 808-*m*. If grant 808-*m* is an UL grant, then BS 300 processes the spatially multiplexed PUSCH transmission according to the associated DMRS resource assignment implicitly or explicitly indicated with grant 808-*m* that was received from UE 200-*n* in step 1206.

By way of non-limiting examples, the following aspects are included in the present disclosure.

Aspect 1 includes a method of providing downlink control information (DCI) to a plurality of user equipment (UE), comprising: assigning each of the plurality of UEs to one of a set of groups, each group identified by a group radio network identifier (G-RNTI); sending to each of the plurality of UEs the G-RNTI, a size of the group, and a position within the group; and sending a group-common DCI (GC-DCI) packet to a particular group with grants for selected ones of the UEs assigned to the particular group.

Aspect 2 includes the method of aspect 1, wherein assigning each of a plurality of UEs to one of asset of groups includes implementing a criteria for grouping, the criteria for grouping includes considerations of one or more factors from a set comprising UL/Dl traffic patterns, transport block sizes for PDSCH/PUSCH transmissions, range of DL/UL coverage, transmission configuration indicator (TCI) state, transmission receive beams.

Aspect 3 includes the methods of aspects 1-2, wherein sending to each of the plurality of UEs includes, for each UE in the plurality of UEs, assembling a message packet that includes the G-RNTI, the size of the group, and the group position; and transmitting the message packet to the UE by dedicated radio resource control (RRC) signaling.

Aspect 4 includes the method of aspects 1-3, wherein sending the GC-DCI packet includes determining grants for a set of UEs in a group associated with a particular G-RNTI; setting individual bits in a group bit map, the group bit map including K bits where K is the size of the group, and where positions for each UE in the set of UEs are activated in the group bit map; constructing the GC-DCI packet, the GC-DCI packet including a DL/UL flag, the grant bit map, a grant block that includes grants for the set of UEs in order of the position of each UE in the set of UEs, and a block that includes a CRC masked with the G-RNTI; and transmitting the GC-DCI packet to UEs in the group.

Aspect 5 includes the method of aspects 1-4, wherein grants indicate one or more of a demodulation reference signal (DMRS) resource assignment. power control commands, and PUCCH resource indicators.

Aspect 6 includes the method of aspects 1-5, wherein the DMRS resource assignment, power control commands, and/or PUCCH resource indicators are ordered within the group.

Aspect 7 includes the method of aspects 1-6, wherein the DMRS resource assignment are ordered first by orthogonal antenna ports and then in order scrambling IDs assigned to the DMRS resources.

Aspect 8 includes the method of aspects 1-6, wherein the DMRS resource assignment, power control commands, and/or PUCCH resource indicators are indicated explicitly in the grant for each UE.

Aspect 9 includes the method of aspects 1-6, wherein the DMRS resource assignment, power control commands, and/or PUCCH resource indicators are implicit in the position of the grant in the grant block.

Aspect 10 includes the aspects 1-9, wherein the GC-DCI packet includes an end-of-grant (EOG) flag and further including determining that the number of grants is too large and, if so, partitioning the grants, wherein constructing the GC-DCI packet includes constructing a sequence of GC-DCI packets to be sent, with the last GC-DCI packet having the EOG flag inactivated indicating no further grants.

Aspect 11 includes the method of aspects 1-10, further including: for each UL grant in the grant block, receiving an ACK or NACK according to the associated PUCCH resource indicator; for each DL grant in the grant block, receiving a spatially multiplexed PUSCH transmission according to the associated power control commands in the grant.

Aspect 12 includes the method of aspects 1-11, wherein the PUCCH resource indicator and the power control commands in the grant may be explicit in the grant.

Aspect 13 includes the method of aspects 1-12, wherein the PUCCH resource indicator and the power control commands in the grant may be implicit in the position of the grant in the grant block.

Aspect 14 includes a method of receiving downlink control information (DCI) from a base station (BS), comprising: receiving from the BS a message packet that includes a group radio network identifier (G-RNTI) indicating an assigned group, a size of the assigned group, and a position in the assigned group; receiving a group-common DCI (GC-DCI) packet; determining that the GC-DCI packet is directed to the group indicated by G-RNTI; determining whether a grant is included according to the position in the assigned group; and if a grant is included, receiving the grant.

Aspect 15 includes the method of aspect 14, wherein receiving from the BS a message packet includes receiving the message packet from the BS by dedicated radio resource control (RRC) signaling.

Aspect 16 includes the method of aspects 14-15, wherein determining that the GC-DCI packet is directed to the assigned group includes retrieving a group identifier from the GC-DCI packet; and determining that the group identifier is the G-RNTI of the assigned group.

Aspect 17 includes the method of aspects 14-16, wherein determining whether a grant is included in the GC-DCI includes retrieving a grant bit map from the GC-DCI; retrieving a bit of the grant bit map in the position in the assigned group; and determining that the grant is included if the bit is activated.

Aspect 18 includes the method of aspects 14-17, wherein receiving the grant includes determining a position of the grant in a grant block of the GC-DCI from a number of activated bits in the grant bit map prior to the position in the assigned group; and recovering the grant from the position of the grant in the grant block.

Aspect 19 includes the method of aspects 14-18 wherein the grant indicates one or more of demodulation reference signal (DMRS) resource assignments, power control commands, and/or PUCCH resource indicators.

Aspect 20 includes the method of aspects 14-19, wherein the demodulation reference signal (DMRS) resource assignments, power control commands, and/or PUCCH resource indicators explicitly in the grant.

Aspect 21 includes the method of aspects 14-19, wherein the position of the grant in the grant block implicitly indicates the demodulation reference signal (DMRS) resource assignment, power control commands, and/or PUCCH resource indicators in the grant.

Aspect 22 includes the method of aspects 14-21, wherein if the grant is a DL grant, applying power control to PUCCH transmissions according to the power control commands associated with the grant, transmitting an ACK or NACK according to an associated PUCCH resource indicator associated with the grant, and decoding spatially multiplexed PDSCH transmission according to the associated DMRS resource allocation associated with the grant; and if the grant is an UL grant, applying power control to spatially multiplexed PUSCH transmission according to the power control commands associated with the grant, and transmitting spatially multiplexed PUSCH according to the DMRS resource assignment associated with the grant.

Aspect 23 includes the method of aspects 14-22, wherein recovering the grant includes determining whether the position of the grant occurs in the GC-DCI; if not, determining whether an end-of-grant flag is set and if so receiving a next GC-DCI packet.

Aspect 24 includes a base station (BS), comprising: a transceiver; a communications module coupled to the transceiver to receive and transmit communications to a plurality of user equipment (UEs); and a processor coupled to the transmitter and the communications module, the processor executing instructions to assign each of the plurality of UEs to one of a set of groups, each group identified by a group radio network identifier (G-RNTI); send to each of the plurality of UEs the G-RNTI, a size of the group, and a position within the group; and send a group-common downlink control information (GC-DCI) packet to a particular group with grants for selected ones of the UEs assigned to the particular group.

Aspect 25 includes a user equipment device, comprising: a transceiver; a communications module coupled to the transceiver to receive and transmit communications to a base station (BS); and a processor coupled to the transceiver and the communications module, the processor executing instructions to receive from the BS a message packet that includes a group radio network identifier (G-RNTI) indicating an assigned group, a size of the assigned group, and a position in the assigned group; receive a group-common downlink control information (GC-DCI) packet; determine that the GC-DCI packet is directed to the group indicated by G-RNTI; determine whether a grant is included according to the position in the assigned group; and if a grant is included, receive the grant.

Aspect 26 includes a base station (BS), comprising: means for assigning each of a plurality of UEs to one of a set of groups, each group identified by a group radio network identifier (G-RNTI); means for sending to each of the plurality of UEs the G-RNTI, a size of the group, and a position within the group; and means for sending a group-common DCI (GC-DCI) packet to a particular group with grants for selected ones of the UEs assigned to the particular group.

Aspect 27 includes a user equipment device, comprising: means for receiving from a base station a message packet that includes a group radio network identifier (G-RNTI) indicating an assigned group, a size of the assigned group, and a position in the assigned group; means for receiving a group-common downlink control information (GC-DCI) packet; means for determining that the GC-DCI packet is directed to the group indicated by G-RNTI; means for determining whether a grant is included according to the position in the assigned group; and if a grant is included, means for receiving the grant.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of providing downlink control information (DCI) to a plurality of user equipment (UE), comprising:
compiling a group-common DCI (GC-DCI) packet, the GC-DCI packet including a group radio network identifier (G-RNTI) indicating an assigned group, grants for selected UEs that are members of the assigned group, and an indication to the UEs in the group whether a grant is included for the UE; and
sending the group-common DCI (GC-DCI) packet to a particular group with grants for selected ones of the UEs assigned to the particular group,
wherein a UE in the particular group identifies the group based on the G-RNTI, determines whether the UE has a grant included in the GC-DCI based on the indication, and recovers the grant from the GC-DCI based on the UE position in the particular group,
wherein compiling the GC-DCI packet includes
determining grants for a set of UEs in the group associated with a Particular G-RNTI;
setting the indication by setting individual bits in a group bit map, the group bit map including K bits where K is the size of the group, and where positions for each UE in the set of UEs are activated in the group bit map; and
constructing the GC-DCI packet, the GC-DCI packet including a DL/UL flag, the grant bit map, a grant block that includes grants for the set of UEs in order of the position of each UE in the set of UEs, and a block that includes a CRC masked with the G-RNTI, and
wherein the GC-DCI packet includes an end-of-grant (EOG) flag and further including determining that the number of grants is too large and, if so, partitioning the grants, wherein constructing the GC-DCI packet includes constructing a sequence of GC-DCI packets to be sent, with the last GC-DCI packet having the EOG flag inactivated indicating no further grants.

2. The method of claim 1, further including assigning each UE in a plurality of UEs to one of a set of groups, each group identified by the G-RNTI; wherein assigning each of a plurality of UEs to one of a set of groups includes implementing a criteria for grouping, the criteria for grouping includes considerations of one or more factors from a set comprising UL/D1 traffic patterns, transport block sizes for PDSCH/PUSCH transmissions, range of DL/UL coverage, transmission configuration indicator (TCI) state, transmission receive beams.

3. The method of claim 2, further including sending to each UE in the plurality of UEs the G-RNTI of the particular group that includes the UE, the UE position in the particular group, and a size of the particular group, wherein sending to each UE includes, for each UE in the plurality of UEs,
assembling a message packet that includes the G-RNTI, the size of the group, and the position within the group; and
transmitting the message packet to the UE by dedicated radio resource control (RRC) signaling.

4. The method of claim 1, wherein grants indicate one or more of a demodulation reference signal (DMRS) resource assignment, power control commands, and PUCCH resource indicators.

5. The method of claim 4, wherein the DMRS resource assignment, power control commands, and/or PUCCH resource indicators are ordered within the group.

6. The method of claim 5, wherein the DMRS resource assignment are ordered first by orthogonal antenna ports and then in order scrambling IDs assigned to the DMRS resources.

7. The method of claim 5, wherein the DMRS resource assignment, power control commands, and/or PUCCH resource indicators are indicated explicitly in the grant for each UE.

8. The method of claim 5, wherein the DMRS resource assignment, power control commands, and/or PUCCH resource indicators are implicit in the position of the grant in the grant block.

9. The method of claim 1, further including:
for each UL grant in the grant block, receiving an ACK or NACK according to an associated PUCCH resource indicator; and
for each DL grant in the grant block, receiving a spatially multiplexed PUSCH transmission according to an associated power control commands in the grant.

10. The method of claim 4, wherein the PUCCH resource indicator and the power control commands in the grant may be explicit in the grant.

11. The method of claim 4, wherein the PUCCH resource indicator and the power control commands in the grant may be implicit in the position of the grant in the grant block.

12. A method of receiving downlink control information (DCI) into a user equipment (UE) from a base station (BS), comprising:
receiving a group-common DCI (GC-DCI) packet from the B S, the GC-DCI packet including a group radio network identifier (G-RNTI) indicating an assigned group, grants for selected UEs that are members of the assigned group, and an indication to UEs in the group whether a grant is included for the UE;
determining that the GC-DCI packet is directed to the assigned group that includes the UE based on the G-RNTI;
determining, from the indication in the GC-DCI packet, whether the UE has a grant included in the GC-DCI packet; and
if the UE has a grant included in the GC-DCI packet, receiving the grant according to a position of the UE in the assigned group,
wherein receiving a GC-DCI packet from the BS includes receiving the GC-DCI packet from the BS by dedicated radio resource control (RRC) signaling,
wherein receiving the grant includes
determining the position of the grant in a grant block of the GC-DCI packet from a number of activated bits in the grant bit map prior to the position in the assigned group; and
recovering the grant from the position of the grant in the grant block, and wherein recovering the grant includes
determining whether the position of the grant occurs in the GC-DCI packet; and
if not, determining whether an end-of-grant flag is set and if so receiving a next GC-DCI packet.

13. The method of claim 12, wherein determining that the GC-DCI packet is directed to the assigned group includes
retrieving a group identifier from the GC-DCI packet; and
determining that the group identifier is the G-RNTI of the assigned group.

14. The method of claim 12, wherein determining whether the UE has a grant included in the GC-DCI packet includes
retrieving a grant bit map from the GC-DCI packet;
retrieving a bit of the grant bit map in the position in the assigned group; and
determining that the grant is included if the bit is activated.

15. The method of claim 12 wherein the grant indicates one or more of demodulation reference signal (DMRS) resource assignments, power control commands, and/or PUCCH resource indicators.

16. The method of claim 15, wherein the demodulation reference signal (DMRS) resource assignments, power control commands, and/or PUCCH resource indicators explicitly in the grant.

17. The method of claim 15, wherein the position of the grant in the grant implicitly indicates the demodulation reference signal (DMRS) resource assignment, power control commands, and/or PUCCH resource indicators in the grant.

18. The method of claim 15, wherein
if the grant is a DL grant,
applying power control to PUCCH transmissions according to the power control commands associated with the grant,
transmitting an ACK or NACK according to an associated PUCCH resource indicator associated with the grant, and
decoding spatially multiplexed PDSCH transmission according to an associated DMRS resource allocation associated with the grant; and
if the grant is an UL grant,
applying power control to spatially multiplexed PUSCH transmission according to the power control commands associated with the grant, and
transmitting spatially multiplexed PUSCH according to the DMRS resource assignment associated with the grant.

19. A base station (BS), comprising:
a transceiver;
a communications module coupled to the transceiver to receive and transmit communications to a plurality of user equipment (UEs); and
a processor coupled to the transceiver and the communications module, the processor executing instructions to
compile a group-common DCI (GC-DCI) packet, the GC-DCI packet including a group radio network identifier (G-RNTI) indicating an assigned group, grants for selected UEs that are members of the assigned group, and an indication to the UEs in the group whether a grant is included for the UE; and
send the group-common downlink control information (GC-DCI) packet to a particular group with grants for selected ones of the UEs assigned to the particular group,
wherein a UE in the particular group identifies the group based on the G-RNTI, determines whether the UE has a grant included in the GC-DCI based on the indication, and recovers the grant from the GC-DCI based on the UE position in the particular group,
wherein instructions to compile the GC-DCI packet includes instructions to
determine grants for a set of UEs in the group associated with a particular G-RNTI;
set the indication by setting individual bits in a group bit map, the group bit map including K bits where K is the size of the group, and where positions for each UE in the set of UEs are activated in the group bit map; and
construct the GC-DCI packet, the GC-DCI packet including a DL/UL flag, the grant bit map, a grant block that includes grants for the set of UEs in order of the position of each UE in the set of UEs, and a block that includes a CRC masked with the G-RNTI, and
wherein the GC-DCI packet includes an end-of-grant (EOG) flag and the instructions further include instructions to determine that the number of grants is too large and, if so, partition the grants, wherein instructions to construct the GC-DCI packet includes instructions to construct a sequence of GC-DCI packets to be sent, with the last GC-DCI packet having the EOG flag inactivated indicating no further grants.

20. A user equipment device, comprising:
a transceiver;
a communications module coupled to the transceiver to receive and transmit communications to a base station (BS); and
a processor coupled to the transceiver and the communications module, the processor executing instructions to
receive a group-common downlink control information (GC-DCI) packet from the BS, the GC-DCI packet including a group radio network identifier (G-RNTI) indicating an assigned group, grants for selected UEs that are members of the assigned group, and an indication to UEs in the group whether a grant is included for the UE;
determine that the GC-DCI packet is directed to the assigned group that includes the UE based on the G-RNTI;
determine, from the indication in the GC-DCI packet, whether Previously Presented a grant included in the GC-DCI packet; and
if a grant is included in the GC-DCI packet, receive the grant according to a position of the UE in the assigned group,
wherein instructions to receive a GC-DCI packet from the BS includes instructions to receive the GC-DCI packet from the BS by dedicated radio resource control (RRC) signaling,
wherein instructions to receive the grant includes instructions to
determine the position of the grant in a grant block of the GC-DCI packet from a number of activated bits in the grant bit map prior to the position in the assigned group; and
recover the grant from the position of the grant in the grant block, and wherein instructions to recover the grant includes instructions to
determine whether the position of the grant occurs in the GC-DCI packet; and
if not, determine whether an end-of-grant flag is set and if so receive a next GC-DCI packet.

21. A base station (BS), comprising:
means for compiling a group-common DCI (GC-DCI) packet, the GC-DCI packet including a group radio network identifier (G-RNTI) indicating an assigned group, grants for selected UEs that are members of the assigned group, and an indication to the UEs in the group whether a grant is included for the UE; and means for sending the group-common DCI (GC-DCI) packet to a particular group with grants for selected ones of the UEs assigned to the particular group, wherein a UE in the particular group identifies the group based on the G-RNTI, determines whether the UE has a grant included in the GC-DCI based in the indication, and recovers the grant from the GC-DCI based on the UE position in the particular group, wherein compiling the GC-DCI packet includes
  determining grants for a set of UEs in the group associated with a particular G-RNTI;
  setting the indication by setting individual bits in a group bit map, the group bit map including K bits where K is the size of the group, and where positions for each UE in the set of UEs are activated in the group bit map; and
  constructing the GC-DCI packet, the GC-DCI packet including a DL/UL flag, the grant bit map, a grant block that includes grants for the set of UEs in order of the position of each UE in the set of UEs, and a block that includes a CRC masked with the G-RNTI, and wherein the GC-DCI packet includes an end-of-grant (EOG) flag and further including determining that the number of grants is too large and, if so, partitioning the grants, wherein constructing the GC-DCI packet includes constructing a sequence of GC-DCI packets to be sent, with the last GC-DCI packet having the EOG flag inactivated indicating no further grants.

22. A user equipment device (UE), comprising:

means for receiving a group-common downlink control information (GC-DCI) packet from the BS, the GC-DCI packet including a group radio network identifier (G-RNTI) indicating an assigned group, grants for selected UEs that are members of the assigned group, and an indication to UEs in the group whether a grant is included for the UE;

means for determining that the GC-DCI packet is directed to the assigned group that includes the UE based on the G-RNTI;

means for determining, from the indication in the GC-DCI packet, whether the UE has a grant included in the GC-DCI; and if the UE has a gran included in the GC-DCI packet, means for receiving the grant according to a position of the UE in the assigned group, wherein receiving a GC-DCI packet from the BS includes receiving the GC-DCI packet from the BS by dedicated radio resource control (RRC) signaling, wherein receiving the grant includes
  determining the position of the grant in a grant block of the GC-DCI packet from a number of activated bits in the grant bit map prior to the position in the assigned group; and
  recovering the grant from the position of the grant in the grant block, and wherein recovering the grant includes
  determining whether the position of the grant occurs in the GC-DCI packet; and
  if not, determining whether an end-of-grant flag is set and if so receiving a next GC-DCI packet.

* * * * *